United States Patent Office 3,001,868
Patented Sept. 26, 1961

3,001,868
RECOVERY OF METALS FROM CYANIDE SOLUTION BY ANION EXCHANGE
John Aveston, Pyrford, David Anthony Everest, Ruislip, and Ronald Alfred Wells, Walton on Thames, England, assignors to National Research Development Corporation, London, England, a British corporation
No Drawing. Filed Feb. 10, 1958, Ser. No. 714,021
Claims priority, application Great Britain Feb. 19, 1957
6 Claims. (Cl. 75—105)

This invention relates to the treatment of aqueous solutions of complex metallic cyanides to facilitate the recovery of the metals therefrom.

Such solutions are often encountered in ore extraction processes, in the extraction of gold for example. In the cyanide process for gold extraction, crushed gold-bearing ore is brought into contact with aqueous alkali metal cyanide solution in the presence of oxygen, and as a result gold passes from the ore into solution as aurocyanide. Many other metals present in the particular ore under treatment, for example, copper, iron and nickel, also pass into solution with formation of their corresponding complex cyanides.

Gold can be selectively removed from the resulting solution, and a particularly good method of doing this, which involves the use of a weakly basic anion exchange resin containing a small proportion, in particular 6 to 10 percent of strongly basic groups, is described in co-pending British applications Nos. 13,122/55 and 36,097/55. The gold can also be selectively removed by precipitation with zinc metal. However done, the gold-freed solution remaining will, such are the large volumes of solution involved, often contain enough nickel or other relatively costly metal to make treatment for the recovery thereof worth while, despite their very low concentration in the solution.

The invention is not confined to solutions arising in gold extractions since similar solutions that is to say dilute solutions containing a desired metal complexed in cyanide solution and also containing iron and/or copper as a complexed cyanide may be encountered in other fields; the desired metals may include nickel, cobalt, silver, palladium, platinum, iridium, osmium, rhodium and selenium.

One way of removing these metals from such complex cyanide solutions of low concentration is to bring the solution into contact with a strongly basic nitrogenous anion exchange resin, that is to say, a resin in which the groups at the exchange positions are quaternary amine groups; and if this procedure is followed, all the metals complexed in the cyanide solution are adsorbed by the resin. Difficulties arise, however, for the reason that adsorption of iron and copper (one or the other of which metals is almost invariably present in such solutions owing to their widespread occurrence in many kinds of ore) occurs simultaneously with that of the other metals, such as nickel. Iron and copper are thus present adsorbed on the resin in about the same proportion relative to the other metals as they were in the solution initially subjected to anion exchange treatment, and this can make recovery of the other metals a matter of considerable difficulty and expense.

The present invention is concerned with an anion exchange method of treating aqueous cyanide solutions in which metals are complexed and in which the complex cyanide of iron and/or copper is also present by which the proportion of iron or copper adsorbed by the resin can be considerably reduced, so that the subsequent recovery of the metals desired (that is those other than copper and iron) is facilitated. The invention depends on the use of a nitrogenous anion exchange resin having both strongly and weakly basic exchange groups, these being present in particular proportions.

According to the invention, a method treating an aqueous solution containing a desired metal other than gold complexed in cyanide solution and also containing iron and/or copper as a complexed cyanide, in order to facilitate recovery of the desired metal therefrom comprises bringing the solution at a pH above 7 into contact with a nitrogenous anion exchange resin having both weakly basic and strongly basic amine exchange groups in a relative proportion such that the ratio R of strongly basic groups to total basic (i.e. strongly basic plus weakly basic) groups lies between 10 and 75 percent, thereby to effect a preferential adsorption of metal other than iron and copper, and thereafter recovering from the resin a product containing the desired metal in increased proportion relative to iron and/or copper than existed in the original aqueous solution.

Preferably, the R value of the resin is between 40 and 65 percent; and particularly good results are obtainable using a resin having R=45 to 55 percent. Anion exchange resins suitable for use in carrying out the invention can be readily prepared from commercially available starting materials. Thus, for the preparation of resins based on a cross-linked polystyrene, use can be made of commercial chloromethylated cross-linked polystyrenes. These are readily convertible to resins having a desired proportion of strongly basic —N(CH$_3$)$_3$+ or —N(C$_2$H$_5$)$_3$+ groups and weakly basic —N(CH$_3$)$_2$ or —N(C$_2$H$_5$)$_2$ groups.

In particular the resin may be prepared by swelling particulate chloromethylated cross linked polystyrene with an anhydrous suspending agent, adding the calculated quantity of dialkylamine to convert the chloromethyl groups to tertiary amine groups, washing and drying the product, suspending it in an anhydrous suspending agent, treating it with alkylhalide in an amount sufficient to cause quaternisation of the desired proportion of tertiary amine groups, and finally washing the product.

In performing the invention, the pH of the aqueous cyanide solution containing the desired metal complexed therein, and the complexed cyanide of copper or iron or both, should be above 7 and is most suitably from 8 to 11. Most complex cyanide solutions encountered will already be of the appropriate pH value. The solution is then passed through a column of the resin. Initially adsorbed copper and iron are displaced downwardly along the column as the flow of solution continues. The constitution of the effluent can be determined, and if it is found to have too reduced a content of the metals other than copper and iron to justify further treatment, it can be allowed to flow to waste. Otherwise, it can be admitted to a further column or columns of resin to bring about the adsorption of further quantities of the desired metal.

Recovery of the desired metal values from the resin will usually most conveniently be achieved by elution. The eluant most satisfactorily used in any particular instance will depend, among other things, on the precise nature of the metals adsorbed and the relative proportions in which they are present in the adsorbate. A large number of eluants are available; usually, however, aqueous sodium thiocyanate solution or an aqueous solution of sodium or ammonium nitrate containing sodium cyanide will be found the most efficient.

From the resulting solutions, which contain a reduced proportion of iron or copper, the desired metals can be recovered by standard chemical methods.

The invention is illustrated by the following examples,

EXAMPLE 1

A resin was prepared as follows:

16 parts by weight of anhydrous dioxan were added to 6 parts by weight of beads of commercial chloromethylated polystyrene cross-linked with the ethyleneglycol ester of methacrylic acid, and the mixture was allowed to stand overnight to swell the beads. The suspension was then cooled to 0° C. and the calculated quantity of anhydrous dimethylamine was added to convert the $-CH_2Cl$ (chloromethyl) groups to $-CH_2NH(CH_3)_2+Cl-$. The product was filtered off, washed with water, and dried in air. It was then suspended in anhydrous dioxan and treated with methyl-iodide in an amount sufficient to cause quaternisation of the desired proportion of tertiary amine groups. The resulting product was then washed with water, then with N hydrochloric acid, and finally with 0.001 N hydrochloric acid, and finally dried in air.

Four grams of the resin in chloride form prepared as described and having an R value of 49, and of total chloride capacity 4 milliequivalents per gram of resin in chloride form, were transferred to a column to form a bed 3 cm. deep. There was then passed through the resin an aqueous cyanide solution (pH 10.5; 20 litres) of the following composition:

|  | Mg./litre |
|---|---|
| Iron (ferrous) | 28 |
| Copper | 42 |
| Nickel | 49 |
| Cobalt | 39 |
| Silver | 10.8 |
| NaCN | 150 |
| NaCNS [1] | 160 |

[1] Present in gold ore leach liquors.

When equilibrium had been established, the resin was washed, dried and ashed to recover the metal values; the ashed product was found to have the following content of metals per gram weight of the original resin in chloride form:

|  | Mg. |
|---|---|
| Iron | 3.1 |
| Copper | 7 |
| Nickel | 52 |
| Cobalt | 39 |
| Silver | 4 |

The proportions of nickel, cobalt and silver relative to iron and copper had therefore changed as follows:

|  | Initial | Final |
|---|---|---|
| Ni/Cu | 1.4 | 7.4 |
| Co/Cu | 0.39 | 5.6 |
| Ag/Cu | 0.26 | 0.57 |
| Ni/Fe | 2.1 | 16.8 |
| Co/Fe | 1.4 | 13 |
| Ag/Fe | 0.39 | 1.3 |

EXAMPLE 2

The procedure of Example 1 was followed exactly up to the point of passing the aqueous cyanide solution through the column of resin. When equilibrium had been established, the column was washed with demineralised water and then treated with 16 bed volumes of 2 N aqueous sodium thiocyanate solution. All the silver, nickel, and cobalt were thus diluted and the eluate product contained also the residual copper and iron.

From the eluate thus obtained silver contaminated with some copper can be recovered by electrolysis under controlled potential following standard practice, electrolysis being discontinued when the current falls off.

Alternatively, the resin can be treated with aqueous 4 N $NaNO_3$-N/10 NaCN. After electrolytic deposition of silver from the eluate product thus obtained, nickel cyanide can be precipitated by careful acidification with dilute nitric acid, to leave a nickel-free solution of sodium cobalticyanide.

EXAMPLE 3

This example illustrates the effect of variations in the value of R.

A solution containing 10 mg. Ni, 10 mg. Cu, 1.2 mg. Ag (all as complex cyanides), 30 mg. NaCNS and 150 mg. NaCN per litre was passed through 1 g. samples of resin made as in Example 1 and containing increasing percentages of the active groups as strong base groups.

*Results*

| R value | Weight adsorbed on resin mg./g. | | | Wt. ratio on resin | |
|---|---|---|---|---|---|
|  | Ni | Cu | Ag | Ni/Cu | Ag/Cu |
| 0 | 2.1 | 0.6 |  | 3.5 |  |
| 13 | 13.7 | 3.6 | 1.5 | 3.8 | 0.40 |
| 17 | 15.6 | 3.9 | 1.5 | 4.0 | 0.38 |
| 30 | 25.2 | 5.3 | 1.7 | 4.75 | 0.32 |
| 37 | 26.9 | 5.9 | 1.7 | 4.55 | 0.29 |
| 56 | 37.6 | 7.0 | 1.5 | 5.4 | 0.21 |
| 84.5 | 55.5 | 19.6 |  | 2.8 |  |

Wt. ratio Ni:Cu in solution 1:1.
Wt. ratio Ag:Cu in solution 10:12.

The R value of an anion exchange resin which is to be used in the method of the invention can be found as follows.

First, the total chloride capacity of the resin is determined by the following procedure:

A known weight (conveniently 1 gram) of the air-dried resin in chloride form is transferred to a column and washed with N hydrochloric acid (200 cc.) and then with 0.001 N hydrochloric acid (500 cc.). The resin is then treated with N ammonium nitrate, and the chloride in the resulting eluate is estimated gravimetrically. The total chloride capacity ($x$ milliequivalents per gram of resin in chloride form) is equivalent to the total of all types of basic groups present in the resin, i.e. strongly basic quaternary ammonium groups and weakly basic groups such as tertiary amine groups.

Secondly, the hydroxyl capacity of the resin is determined by the following procedure:

A known weight of the air-dried resin in chloride form is washed with 2 N sodium hydroxide solution until the effluent is chloride-free. The resin is then washed with demineralised water until the effluent is hydroxyl-free. At this stage, the strongly basic groups in the resin are in the hydroxyl form and the weakly basic (primary, secondary or tertiary amine) groups are in the free-base form. The resin is then treated with aqueous sodium nitrate of pH between 8 and 9 to displace the hydroxyl ions associated with the quaternary ammonium groups. The hydroxyl ion content of the eluate is estimated by titration with standard hydrochloric acid using bromophenol blue as indicator; hence is determined the number ($y$) of milliequivalents of acid per gram of resin in chloride form required to neutralise these hydroxyl ions. The R value of the resin is then $100\ y/x$.

We claim:

1. A method of treating an aqueous solution containing at least one of the desired metals nickel, cobalt, silver, palladium, iridium, osmium, rhodium and selenium complexed in cyanide solution, and also containing at least one of the metals iron and copper as a complex cyanide, gold being substantially absent from said aqueous solution, in order to facilitate the recovery of at least one of the desired metals therefrom which comprises bringing the solution at a pH above 7 into contact with a nitrogenous anion exchange resin having both weakly basic and strongly basic amine exchange groups in a relative proportion such that the ratio R of strongly basic groups to total basic (i.e. strongly basic plus weakly basic) groups lies between 10 and 75 percent, thereby to effect a preferential adsorption of metal other than iron and copper, and thereafter recovering from the resin a product containing the desired metal in increased proportion relative to such iron and copper as is present in the original aqueous solution.

2. A method according to claim 1 in which the ratio R is between 40 and 65 percent.

3. A method according to claim 1 in which the ratio R is between 45 and 55 percent.

4. A method according to claim 1 in which the solution has a pH of 8 to 11 before being brought into contact with the resin.

5. A method according to claim 1 in which the resin is based on cross-linked polystyrene.

6. A method according to claim 1 in which the resin is one prepared from chloromethylated cross-linked polystyrene.

References Cited in the file of this patent

UNITED STATES PATENTS

| | | |
|---|---|---|
| 2,801,224 | Greer | July 30, 1957 |
| 2,839,389 | Kember et al. | June 17, 1958 |

OTHER REFERENCES

"Ion Exchange Process for Recovery of Gold From Cyanide Solution," Burstall et al., Industrial and Engineering Chemistry, vol. 45, No. 8, August 1953, pages 1648–58.

"Engineering Aspects of Ion Exchange in Hydrometallurgy," Dasher et al., Journal of Metals, January 1957, pages 185–192.

"Behavior of Ion Exchange Resins in Solvents Other Than Water," Bodamer et al., Industrial and Engineering Chemistry, vol. 45, No. 11, November 1953, pages 2577–2580.